United States Patent
Dupre et al.

(10) Patent No.: US 9,430,721 B2
(45) Date of Patent: Aug. 30, 2016

(54) SYSTEM FOR DISPLAYING PRINTER INFORMATION

(71) Applicant: OCE-TECHNOLOGIES B.V., Venlo (NL)

(72) Inventors: Michaël Dupre, Venlo (NL); Stéphane Binetruy, Venlo (NL); Arlette Del-Aguila, Venlo (NL)

(73) Assignee: OCE-TECHNOLOGIES B.V., Venlo (NL)

( * ) Notice: Subject to any disclaimer, the term of this patent is extended or adjusted under 35 U.S.C. 154(b) by 0 days.

(21) Appl. No.: 14/615,221

(22) Filed: Feb. 5, 2015

(65) Prior Publication Data

US 2015/0227820 A1 Aug. 13, 2015

(30) Foreign Application Priority Data

Feb. 13, 2014 (EP) .................................... 14154958

(51) Int. Cl.
| | |
|---|---|
| G06K 15/00 | (2006.01) |
| G05B 15/02 | (2006.01) |
| H04N 1/00 | (2006.01) |
| G06F 3/00 | (2006.01) |
| G06F 3/01 | (2006.01) |
| G06F 3/03 | (2006.01) |
| G06F 3/042 | (2006.01) |

(52) U.S. Cl.
CPC ............. *G06K 15/005* (2013.01); *G05B 15/02* (2013.01); *G06F 3/005* (2013.01); *G06F 3/011* (2013.01); *G06F 3/0304* (2013.01); *G06F 3/0425* (2013.01); *H04N 1/00204* (2013.01); *H04N 1/00251* (2013.01)

(58) Field of Classification Search
CPC . G06K 15/005; G06F 3/0304; G06F 3/0425; G06F 3/005; G06F 3/011; H04N 1/00204; H04N 1/00251; G05B 15/02
USPC ................................................ 358/1.13, 1.15
See application file for complete search history.

(56) References Cited

U.S. PATENT DOCUMENTS

| | | | |
|---|---|---|---|
| 5,873,070 | A | 2/1999 | Bunte et al. |
| 6,175,610 | B1 | 1/2001 | Peter |
| 2010/0277762 | A1* | 11/2010 | Eguchi ............... G03G 15/5016 358/1.15 |
| 2013/0229690 | A1 | 9/2013 | Sumita et al. |
| 2014/0126018 | A1* | 5/2014 | Sugimoto ............... G06F 3/013 358/1.15 |

FOREIGN PATENT DOCUMENTS

JP 2010117422 A * 5/2010

* cited by examiner

*Primary Examiner* — Kent Yip
(74) *Attorney, Agent, or Firm* — Birch, Stewart, Kolasch & Birch, LLP

(57) ABSTRACT

A system includes a printer including a plurality of functional modules and a controller configured to control the print process, a storage device configured to store information regarding supporting an operator to interact with a functional module of the plurality of functional modules other than the local user interface of the printer, a presence detection system configured to detect a presence of an operator near or at the functional module, and an information presentation device configured to present information within a perception reach of the operator. The system includes a computer device connected to the presence detection system, the storage device, the printer and the information presentation device. The computer device is configured to retrieve, upon detection of a presence of an operator near or at the functional module by the presence detection system, status information of the status of the functional module of the printer from the controller and support information regarding supporting an operator to interact with the functional module from the storage device, and to select part of the support information taking into account the status information, and to provide the selected information to the information presentation device in order to present the selected information to the operator within the perception reach of the operator.

11 Claims, 4 Drawing Sheets

SYSTEM FOR DISPLAYING PRINTER INFORMATION

CROSS-REFERENCE TO RELATED APPLICATIONS

This application claims priority under 35 U.S.C. §119(a) to Application No. 14154958.4, filed in Europe on Feb. 13, 2014, the entire contents of which is hereby incorporated by reference into the present application.

BACKGROUND OF THE INVENTION

1. Field of the Invention

The present invention relates to a system comprising a printer comprising a plurality of functional modules and a controller for controlling the print process, and a storage device for storing information regarding supporting an operator to interact with a functional module of the plurality of functional modules other than the local user interface of the printer.

In a print production environment, the production of a print job can be managed at the printing system comprising a software system that handles the image data to be printed according to specifications of the print job, schedules the actions to be performed by operators and provides status feedback on the production progress to the production manager and—for example through the Internet—to the end customers. The software system may be installed at the printer or on a computer system connected to the printer. The printer comprises a plurality of functional modules. One of the functional modules is the local user interface attached to the printer. The operator can operate on the local user interface by means of entering commands, applying gestures, clicking a mouse, etc. The storage device may be a local storage device, but may also be an internal or external server connected via a network, for example a knowledge base or a support website.

The present invention further relates to a method for presenting support information supporting the operator to interact with a functional module of the printer in the system according the present invention.

The present invention further relates to a non-transitory computer readable medium comprising computer executable program code configured to instruct a computer to perform the method according to the present invention.

2. Description of Background Art

Usually, the local user interface of the printer is on a fixed position at the printer. This is disadvantageous, since an operator may be at a side of the printer at which he cannot operate at or even see on the screen of the local user interface. Especially, when the footprint of the printer is large, this is a problem. When the distance between a functional module other than the local user interface and the local user interface is large, the interaction of the operator with the functional module, which has a problem, and the interaction of the operator with the local user interface, cannot be combined, i.e. for each support step the operator has to move from the functional module, which has a problem, to the local user interface, and vice versa. The problem of the functional module may be due to an event hampering normal operation of a functional unit, but not requiring immediate attention. The problem of the functional module may also be due to an event impeding operation of the functional unit.

In another environment, the operator may have a mobile device comprising operator manuals for the specific printer. If there is a problem with one of the functional modules other than the local user interface, the support information needed by the operator is normally not among the start window information on the screen of the local user interface or on the first page of the operator manual for the printer on the operator's mobile device. The operator has to navigate to the appropriate support information for the functional module, which has the problem.

SUMMARY OF THE INVENTION

It is an objective of the present invention to facilitate an easier way of working for the operator when there is a problem with a specific functional module of the printer.

According to an embodiment of the present invention, this objective is achieved by a system according to the preamble, wherein the system further comprises an information presentation device configured to present information within a perception reach of the operator, if the operator is at or near the functional module, a presence detection system configured to detect a presence of an operator near or at the functional module, and a computer device connected to the presence detection system, the storage device, the printer and the information presentation device, wherein the computer device is configured to retrieve, upon detection of a presence of an operator near or at the functional module by the presence detection system, status information of the status of at least the functional module from the controller and support information regarding supporting an operator to interact with the functional module from the storage device, and to select part of the support information taking into account the status information, and to provide the selected information to the information presentation device in order to present the selected information to the operator within the perception reach of the operator.

With knowledge of the exact position of the operator, dedicated information regarding supporting the operator to interact with the appropriate functional module is presented to the operator. The operator does not need to navigate to the correct information. Only the support information for the functional module that the operator is close to is presented. The presentation is within the perception reach of the operator, i.e. the operator does not need to move from the functional module to another place for getting to the support information. Especially, for large wide format printers, which have a large footprint, the present invention is advantageous.

According to an embodiment of the present invention, the functional module is one of a group of a receiving medium input module, a receiving medium output module, a sorting module, a printer engine, a receiving medium paper path module, and a marking material supply module. In case of a printer having a large footprint, this is advantageous, since the functional module may be far away from the local user interface of the printer.

According to an embodiment of the present invention, the computer device is part of or includes the controller of the printer. The controller includes a computer device according to the present invention. In this way, the computer device is close to the printer. The storage device may also be part of the controller. Both inclusions are advantageous for a quick data transport from one unit to the other unit.

According to an embodiment of the present invention, the computer device is part of the presence detection system. The presence detection device is equipped with a computer device for retrieving support information and status information. The presence detection system selects the needed information and submits it to the information presentation device.

According to an embodiment of the present invention, the computer device is part of the information presentation device. In this way, the computer device retrieves the support information from the storage device and retrieves the status information from the controller of the printer. The computer device selects the relevant information according to the present invention. The relevant information can be immediately presented by the information presentation device, since the computer device is part of the information presentation device.

According to an embodiment of the present invention, the information presentation device is a mobile device of the operator and the presence detecting system is configured to receive position information of the position of the mobile device, wherein the storage device comprises position information with respect to the position of each of the plurality of functional modules within a floor plan of the printer, wherein the computer device is configured to retrieve, upon reception of a position of the mobile device near or at the printing system, from the storage device, the support information regarding supporting a user to interact with said functional module, and wherein said functional module is determined according to the position information as the functional module among the plurality of functional modules that is closest to the mobile device. This is advantageous since, if the storage device is outside the printer, according to this embodiment the printer needs only to be accessed for status information of at least the functional module. Such an access to the printer is easy because the printer is networked with the mobile device.

According to an embodiment of the present invention, the presence detection system is a presence sensor attached to the functional module. Each functional module other than the local user interface may be equipped with a presence sensor. The presence sensor may record a presence of an operator near or at the corresponding functional module and send a signal to the computer device for further retrieval of support information and status information.

According to an embodiment of the present invention, the presence detection system is a camera system for capturing the operator near or at the functional module. The camera system submits captured images to the computer device. The computer device may analyze the captured images and detect a presence of an operator near or at a functional module of the printer. It is noted that the computer device has image processing software for detecting moving objects, like human beings, and for detecting the appropriate functional module of the printer.

According to an embodiment of the present invention, the information presentation device is a projector system configured to project the selected information within the perception reach of the operator. This is advantageous, because the operator can use both hands for interaction with the functional module, while he reads the projected support information dedicated to the functional module near the operator. The projection may take place on a wall part or on a floor part near the functional module or on a flat surface of the printer itself. The flat surface of the printer, the wall part or the floor part is selected to be within the perception reach of the operator near the functional module.

According to an embodiment of the present invention, the information presentation device is an audio system configured to provide the selected information in an audible voice within the perception reach of the operator. This is advantageous, because the operator can use both hands for interaction with the functional module, while he hears the audible voice enouncing the support information dedicated to the functional module near the operator. The audio system may be part of the printer.

According to an embodiment of the present invention, the information presentation device being a projector system and the presence detection system being a camera system are combined into a camera-projector system. Camera-projector systems are widely available on the technical market and can be easily integrated in the system according to the present invention.

The embodiments of the system mentioned here-above may be combined with respect to the distribution of actions to be executed by the parts of the system, i.e. the computer device, the printer, the controller, the storage device, the information presentation unit and the presence detection unit.

The present invention also relates to a method for presenting information to an operator of a printer having a plurality of functional modules, the method comprising the steps of detecting the presence of the operator near or at a functional module of the plurality of functional modules other than the local user interface of the printer, retrieving status information of a status of at least the functional module, retrieving support information regarding supporting the user to interact with the functional module, selecting a part of the support information taking into account the status information, and presenting the selected information within the perception reach of the operator.

The present invention also relates to a non-transitory computer readable medium comprising computer executable program code configured to instruct a computer to perform the method according to the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
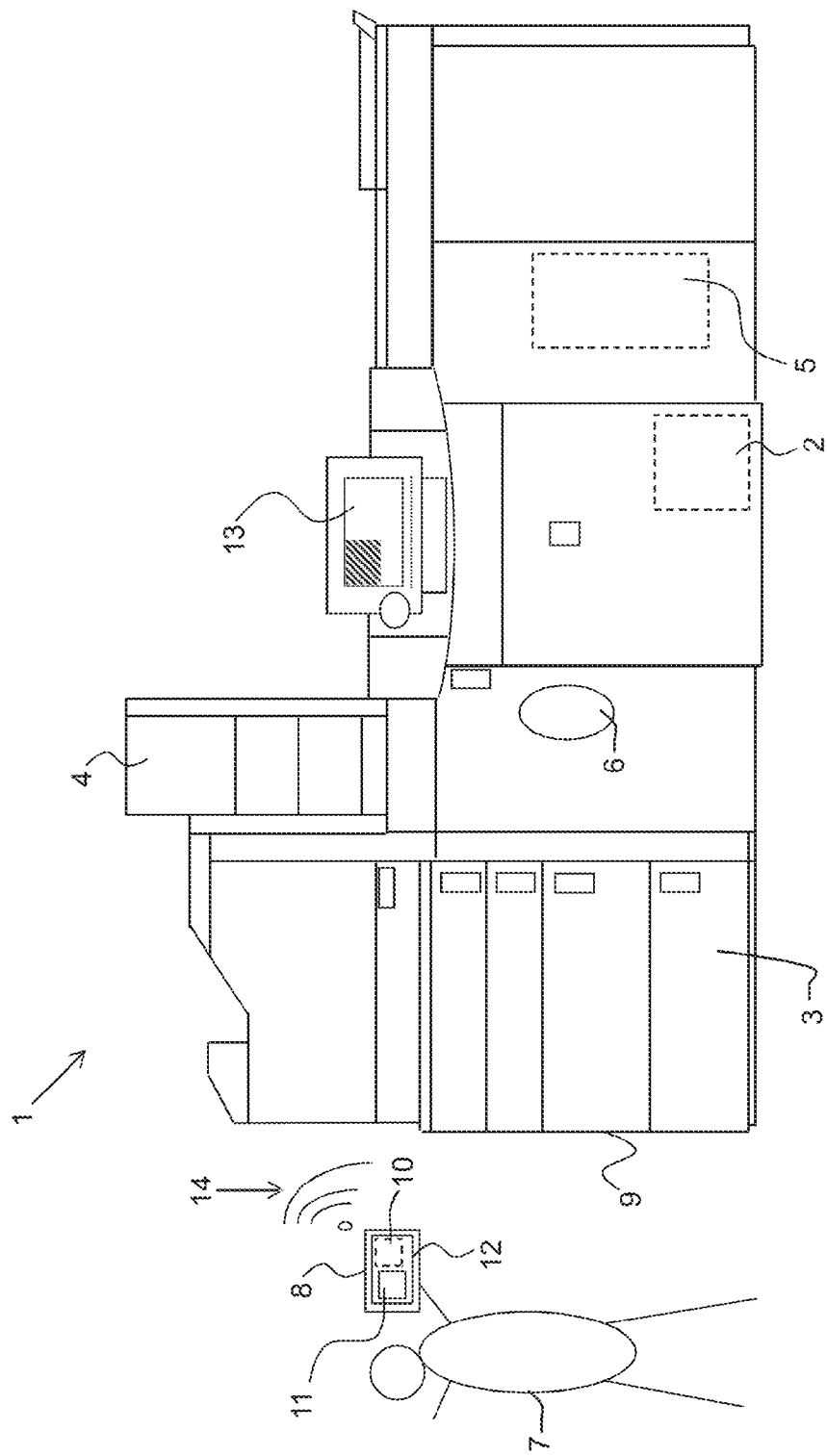
FIG. 1 is a first embodiment of the system according to the present invention.

The present invention will now be described with reference to the accompanying drawings, wherein the same reference numerals have been used to identify the same or similar elements throughout the several views.

FIG. 1 shows a first embodiment of a system according to the present invention. The system comprises a cut sheet printer 1 comprising a plurality of functional modules, like a local user interface 13, a controller 2 inside a frame of the printer 1, a receiving medium input module 3, a receiving medium output module 4, an engine module 5 inside the frame of the printer 1 and a marking material supply module 6. The controller may also be positioned apart from the printer 1 and connected to the printer 1 via a network. The operator 7 has a wireless mobile device 8 with near field communication capability 14. The operator 7 wants to load media on the left side 9 of the printer 1 on the receiving medium input module 3. The operator 7 walks to the left side 9 of the printer 1 with his mobile device 8 near the receiving medium input module 3. The mobile device 8 has stored a floor plan of the printer 1 or a three-dimensional image of the printer 1 with coordinates for each functional module 3, 4, 5, 6. In an alternative embodiment, the mobile device 8 retrieves the floor plan or the three-dimensional image from a server connected to the mobile device 8. The near field capability 14 of the mobile device 8 registers the position of the operator 7 on the floor plan or on a three-dimensional image of the printer 1. A software application installed on the mobile device 8 is able to compare this position with the coordinates of the functional modules 3, 4, 5, 6. The software application installed on the mobile device 8 selects the functional module, which is closest to the operator 7. In this case, the functional module, which is closest to the operator 7, is the receiving medium input module 3.

A storage device 10 also resides on the mobile device 8. The storage device 10 comprises support information regarding supporting the operator to interact with each of the functional modules 3, 4, 5, 6. The software application on the mobile device 8 selects the support information regarding the receiving medium input module 3. The mobile device 8 is also wirelessly connected to the controller 2 of the printer 1 via a wireless network. The support information may also be stored on an internal or external server connected via a network, for example a knowledge base application or a support website.

The software application installed on the mobile device 8 retrieves status information from the controller 2 of at least the receiving medium input module 3 of the printer 1. The status information may be, for example, a status that the receiving medium input module 3 is empty and the print queue contains a print job to be printed on a particular receiving medium, which has to be input in the receiving medium input module 3.

The software application installed on the mobile device 8 selects a part of the support information, which part takes the retrieved status information into account. The selected part 11 of the support information is shown on the display screen 12 of the mobile device 8. The selected part may be, for example, a media loading assistance program. Instead of showing a complete overview of the support information of all functional modules 3, 4, 5, 6 or a complete overview of support information of the receiving medium input module 3, the application shows only the appropriate part 11 of the support information of the receiving medium input module 3, taking into account the status information of at least the receiving medium input module 3 of the printer 1.

Other embodiments may be envisioned in which the software application resides on the controller 2 of the printer 1 and the controller 2 has a connection via the near field communication 14 of the mobile device 8 in order to communicate results from the running of the software applications. In another embodiment, the storage device does not reside on the mobile device 8, but resides in the controller 2 of the printer 1.

This embodiment of the system will lead to a higher productivity of the operator, since the dedicated information 11 on the display screen 12 of the mobile device 8 tends the operator to carry out an immediate and correct interaction with the receiving medium input module 3 for solving a problem or taking the appropriate action to continue the printing of print jobs from the print queue. Once the operator 7 has input the desired receiving medium, the mobile device 8 shows a display screen reporting that the printer 1 is ready to print (not shown). The operator is free to move away with his mobile device 8 and start print production by means of the mobile device 8 or by means of the local user interface 13 of the printer 1.

In a further embodiment, each functional module 3, 4, 5, 6 is provided with an attaching mechanism configured to attach the mobile device 8, or the mobile device 8 is provided with a magnetic back cover and the printer 1 has a metallic frame. In this way, the operator can attach the mobile device near or at the functional module 3, 4, 5, 6 and has both hands free and available in order to carry out operations upon the functional module 3, 4, 5, 6, for example to place a desired receiving medium in the receiving medium input module 3.

The mobile device 8 providing the support information is still meant to be physically on the frame of the printer 1 like the local user interface, but the operator decides on the location based on the vicinity of the functional module. Making the support information available while the mobile device is attached to the printer 1, the issue of 100% mobile devices that tend to get lost is addressed.

Figure 2:
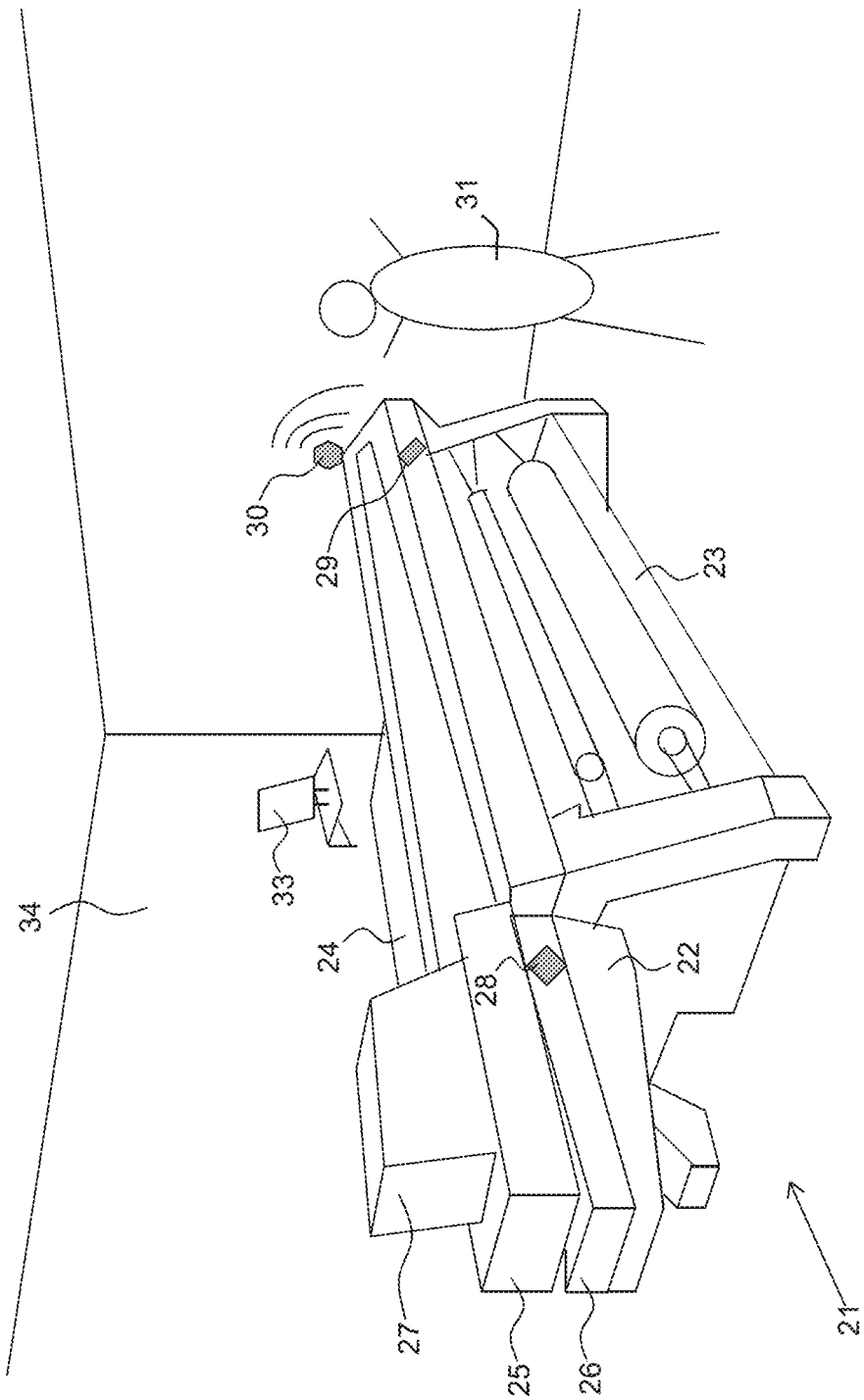
FIG. 2 is a second embodiment of the system according to the present invention.

FIG. 2 shows a second embodiment of a system according to the present invention. The system in perspective view comprises an inkjet roll-to-roll/roll-to-sheet printer 21 comprising a plurality of functional modules, like a local user interface 33 separately positioned from the printer 21 along a wall 34 of the printing room, a marking material maintenance station 22, a receiving medium input module 23, a receiving medium output module 24, an engine module 25, a maintenance station drawer 26 and a lamps housing 27. Each of the functional modules 22, 23, 24, 25, 26, 27 may be provided with a presence sensor. The presence sensor may be a movement detector or an optical actuator. The maintenance station drawer 26 is provided with a presence sensor 28. The receiving medium input module 23 is provided with a presence sensor 29. The printer 21 is also provided with an information presentation device being an audio system 30 configured to provide the selected information in an audible voice within the perception reach of an operator 31. The audio system 30 may be distributed among the functional modules 22, 23, 24, 25, 26, 27 (not shown) or concentrated on one spot of the printer 21 (as shown in FIG. 2). The audio system may also be positioned apart from but near to the printer 21 (not shown).

The presence sensor 29 detects that the operator 31 is near the receiving medium input module 23. The presence sensor 29 is connected to the controller (not shown) of the printer 21. The presence sensor 29 submits a signal to the controller. The controller comprises software to relate the received signal to the receiving medium input module 23 as the functional module close to the operator 31. The controller or a computer connected to the local user interface 33 comprises a storage device (not shown). The storage device comprises support information regarding supporting the operator to interact with each of the functional modules 22, 23, 24, 25, 26, 27. It is assumed that the controller comprises the storage device. The storage device may also be on an internal or external server connected to the controller.

A software application installed on the controller selects the support information regarding the receiving medium input module 23. The software application installed on the controller retrieves status information of at least the receiving medium input module 23 of the printer 21. The status information may be, for example, a status that the receiving medium input module 23 needs to be turned and the print queue contains a print job to be printed on a particular receiving medium, which has been input in the receiving medium input module 23. The software application installed on the controller selects a part of the support information, which part takes the retrieved status information into account. The selected part of the support information, for example audio signals representing a phrase "please turn," is submitted from the controller to the audio system 30. The audio system 30 enounces the phrase into the perception reach of the operator, i.e. the operator hears the spoken phrase and can immediately interact with the receiving medium input module 23 in accordance with the spoken phrase, i.e. turning a roll of receiving medium.

Figure 3:
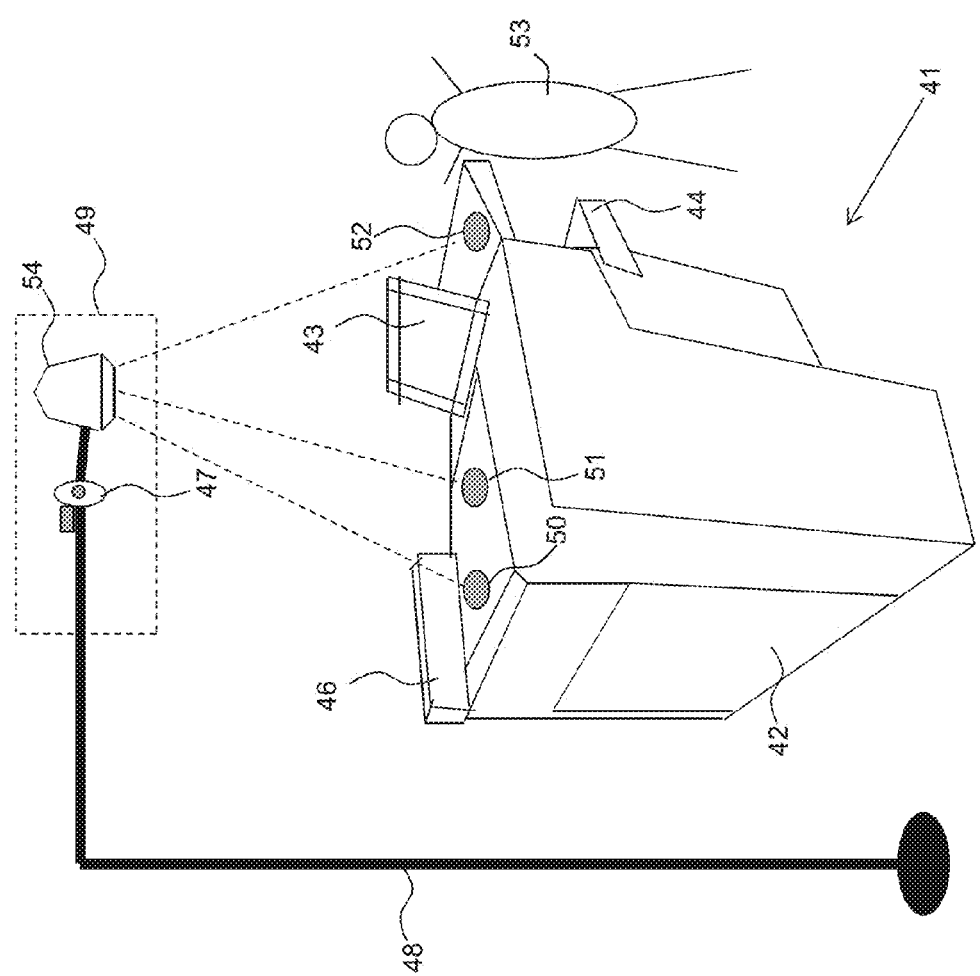
FIG. 3 is a third embodiment of the system according to the present invention.

FIG. 3 shows a third embodiment of a system according to the present invention. The system in perspective schematic view comprises an inkjet roll-to-roll/roll-to-sheet printer 41 comprising a plurality of functional modules, like a local user interface 43, a controller (not shown) inside the printer 41, a receiving medium input module 42, a receiving medium output module 44, an engine module (not shown) inside the printer 41 and a marking material supply module 46. A pole 48 is standing near the printer 41. A camera-projector system 49 is attached to the pole 48 and has a reach over the whole foot print of the printer 41 with respect to the camera of the camera-projector system as well as with respect to the projector of the camera-projector system. In an alternative embodiment, the camera-projector system comprises a mirror system for guiding light reflections from the printer 41 to the camera and light beams from the projector to the printer 41. A camera 47 of the camera-projector system 49 is able to register any movement (of an operator) at the printer 41 or in a close neighborhood of the printer 41. A projector 54 of the camera-projector system 49 is able to present support information on projection areas 50, 51, 52 on a flat surface of the printer 41. The location of the projection areas is selected in such a way that for each functional module with which the operator may need to interact, there is a projection area available, which is perceivable by the operator when he is close to the corresponding functional module.

In FIG. 3, the operator 53 is close to the receiving medium output module 44 at the rear end of the printer 41. It is noted that, in this position, the operator 53 is unable to look on the screen of the local user interface 43. He is unable to discern support information with respect to the receiving medium output module 44 on the screen of the local user interface 43. The camera 47 of the camera-projector system 49 captures images of the operator near the receiving medium output module 44. The camera-projector system 49 is connected to the controller inside of the printer 41 or to a computer device (not shown) outside the printer 41. The controller, respectively the computer device, receives an image from the camera 47 and is configured to determine the functional module of the printer 41, which is closest to the operator 53. Such a determination can be achieved by comparing the position of the operator on the captured image with coordinates of each functional module on the captured image. Such coordinates may be stored beforehand in the controller, respectively in the computer device.

The determination will reveal that the operator 53 is closest to the receiving medium output module 44. The controller or the computer device comprises a storage device (not shown). The storage device comprises support information regarding supporting the operator to interact with each of the functional modules 42, 43, 44, 46. A software application installed on the controller, respectively the computer device, selects the support information regarding the receiving medium output module 44. The controller retrieves status information of at least the receiving medium output module 44 of the printer 41, respectively the computer device retrieves the status information from the controller. The status information may be, for example, a status that the receiving medium output module 44 needs to be emptied. The software application installed on the controller, respectively on the computer device, selects a part of the support information, which part takes the retrieved status information into account. The selected part of the support information, for example an instruction for handling a full loaded receiving medium output module, is submitted to the projector 54 of the camera-projector system 49 from the controller, respectively from the computer device.

The projector 54 of the camera-projector system 49 projects the instruction in the projection area 52 near the receiving medium output module 44 within the visual perception reach of the operator, i.e. the operator can see the instruction and can immediately interact with the receiving medium output module 44 in accordance with the instruction. The instruction may be shown as an action list, a menu, a part of a manual or a video. In case of a flat bed printer, the projection areas 50, 51, 52 may be situated on the flat bed area.

Figure 4:
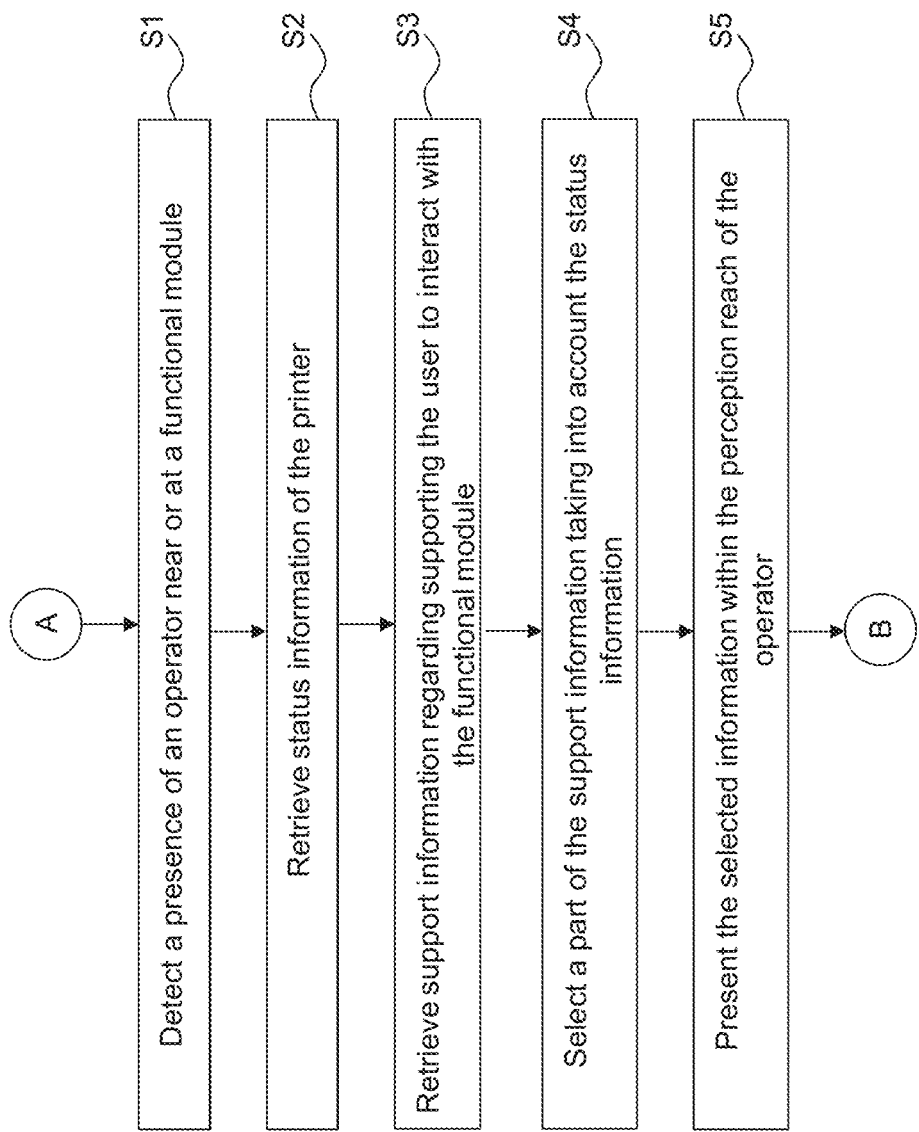
FIG. 4 is a flow diagram of the method according to the present invention.

FIG. 4 is a flow diagram of an embodiment of the method according to the present invention. The method is used for presenting information to an operator of a printer, which has a plurality of functional modules.

From a starting point A, a first step S1 is reached. According to the first step S1 of the method, a presence of an operator is detected near or at a functional module of the plurality of functional modules other than the local user interface of the printer. The detection is done by the presence detection system.

According to a second step S2, status information of at least the functional module of the printer is retrieved. The status information is available on the controller and may be retrieved by the computer device.

According to a third step S3, support information regarding supporting the user to interact with the functional module is retrieved. The support information is available on the controller, on the computer device itself or in the information presentation device.

According to a fourth step S4, a part of the support information is selected taking into account the status information.

According to a fifth step S5, the selected information is presented within the perception reach of the operator by the information presentation device. The method ends in an endpoint B.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A system, comprising:
   a printer comprising a plurality of functional modules and a controller configured to control a print process;
   a storage configured to store information regarding supporting an operator to interact with a functional module of the plurality of functional modules other than a local user interface of the printer;
   a presence detection system positioned near or at the printer and separate from the operator, and configured to detect a presence of an operator near or at said functional module;
   an information presentation device configured to present information within a perception reach of the operator, if the operator is at or near said functional module; and
   a computer device connected to the printer, the storage, the presence detection system, and the information presentation device,
   wherein the computer device is configured to retrieve, upon detection of a presence of an operator near or at said functional module by the presence detection system, status information of the status of at least said functional module from the controller and support information regarding supporting an operator to interact with said functional module from the storage, and to select part of the support information taking into account the status information, and to provide the selected information to the information presentation device in order to present the selected information to the operator within the perception reach of the operator, and
   wherein the information presentation device is a projector system configured to project the selected information within the perception reach of the operator on one out of a wall part near the functional module, a floor part near the functional module and a flat surface of the printer itself.

2. The system according to claim 1, wherein said functional module is one of a group of a receiving medium input module, a receiving medium output module, a sorting module, a printer engine, a receiving medium paper path module, and a marking material supply module.

3. The system according to claim 2, wherein the computer device is part of or includes the controller of the printer.

4. The system according to claim 2, wherein the computer device is part of the presence detection system.

5. The system according to claim 2, wherein the computer device is part of the information presentation device.

6. The system according to claim 1, wherein the presence detection system is a presence sensor attached to said functional module.

7. The system according to claim 1, wherein the presence detection system is a camera system for capturing the operator near or at said functional module.

8. The system according claim 7, wherein the information presentation device and the presence detection system are combined into a camera-projector system.

9. The system according to claim 8, wherein the camera-projector system has a reach over a whole foot print of the printer.

10. A method for presenting information to an operator of a printer having a plurality of functional modules, the method comprising the steps of
    detecting, by a presence detection system positioned near or at the printer and separate from the operator, the presence of the operator near or at a functional module of the plurality of functional modules other than the local user interface of the printer;
    retrieving status information of a status of at least said functional module;
    retrieving support information regarding supporting the user to interact with said functional module;
    selecting a part of the support information taking into account the status information; and
    presenting the selected information within the perception reach of the operator on one out of a wall part near the functional module, a floor part near the functional module and a flat surface of the printer itself.

11. A non-transitory computer readable medium comprising computer executable program code configured to instruct a computer to perform the method according to claim 10.

* * * * *